3,476,737
METHOD FOR SEPARATING SUBSTANCES OF DIFFERENT MOLECULAR SIZES FROM A VISCOUS SOLUTION OF SAID SUBSTANCES
Nils Ingvar Arne Emneus, Erik B. Gelotte, Nils G. Rehn, and Bjorn G. F. Soderqvist, Uppsala, Sweden, assignors to Pharmacia Fine Chemicals AB, Uppsala, Sweden, a company of Sweden
No Drawing. Filed Apr. 14, 1967, Ser. No. 630,849
Claims priority, application Sweden, Apr. 14, 1966, 5,071/66
Int. Cl. B01d *15/08;* C07g *7/00;* C08b *19/08*
U.S. Cl. 260—112　　　　　　　　　　　　　　　　8 Claims

ABSTRACT OF THE DISCLOSURE

A invention is concerned with a method for separating substances of different molecular sizes from a viscous solution of these substances. The term "viscous" in the disclosure and claims is used to describe a solution having a viscosity of 5 centipoise or more. Thus, more specifically the invention pertains to a method for separating substances of different molecular sizes from a solution which has a viscosity of 5 centipoise or more; the solution being introduced into a stationary bed of mutually immobile gel grains, swollen in the solvent and of such structure that none of the substances of relatively large molecular sizes present in the solution are able to penetrate into the interior of the gel grains, and a solution depleted or released on the substances of relatively small molecular sizes being removed from the bed.

BACKGROUND

Such a method is previously known (vide The Journal of Chromatography 5 (1961), 103–115). The known method is carried out as a convention gel filtration process, wherein a sample containing the substances to be separated from each other is applied to the surface of a bed comprising gel grains swollen in the solvent, whereupon elution is carried out with that solvent in which the substances to be separated are dissolved. The separated substances are removed in fractions from the outlet of the bed. As can be seen from the publication, the result of the separation is considerably impaired at high viscosities and may be completely non-existent if the viscosity of the solvent to be separated is very high. Naturally, the problem can be solved by diluting a viscous solution prior to the separation process, to such an extent that it obtains a viscosity suitable for the purpose of separation. However, this would necessitate using a larger bed and would extend the time taken to complete the separation process, and consequently increase the costs therefor. In addition, it is also often necessary to concentrate the separated fractions so that they return to their original concentration, which adds further to the costs of the process.

THE PRESENT INVENTION

It has now been shown that these disadvantages can be considerably reduced or even avoided if, when applying the above defined method, the additional measures are adopted of ensuring that, prior to introducing the solution into the bed, the spaces between the gel grains are completely or substantially filled up with a gaseous medium or a liquid immiscible with the solvent and, additionally, to extend the solution when introducing it into the bed in a layer over the inlet side of the bed and cause the said solution to pass through the bed as a zone.

If the spaces between the gel grains are filled with a swelling agent i.e. the same liquid which is enclosed within the gel grains, before the solution to be separated is introduced into the bed, said swelling agent can be removed from the bed by driving it out with another liquid which is immiscible with or only partly miscible with the enclosed liquid. If the swelling agent is water, the gel grains can thus be freed from the water by a driving-out process with a higher alcohol, e.g. n-butyl alcohol or hexanol, or a hydrocarbon such as benzene or a mixture of hydrocarbons such as benzine or a substituted hydrocarbon such as trichloroethylene.

In accordance with the invention it has been shown expedient to fill the spaces between the gel grains with the gaseous medium, or possibly with the liquid immiscible with the solvent, while utilizing centrifugal force. According to another embodiment of the invention the spaces between the gel grains can be filled up with a gaseous medium or a liquid immiscible with the solvent by producing a difference in pressure between the inlet side and the outlet side of the bed. Thus, a positive pressure can be created on the inlet side, or conversly a sub-pressure on the outlet side.

According to another embodiment of the invention, a suitable bed can be prepared by mechanically compressing the bed so that the liquid between the gel grains is forced out, whereupon the bed is allowed to expand so that either the gaseous medium or the liquid immiscible with the solvent is sucked in between the gel grains.

An advantageous embodiment of the invention is provided if the method according to the invention is effected in a centrifuge, utilizing centrifugal force in realizing the following steps: to collect and pack and gel bed used as a separation medium, to remove the swelling agent present between the gel grains, to introduce either a gaeous medium or possibly a liquid immiscible with the swelling agent, to bring the sample to be treated over the inlet side of the bed built up in the centrifuge, to allow the sample to pass through the bed, the movement speed being suitably controlled by the r.p.m. of the centrifuge, at the same time as the solution is freed from or is depleted with regard to the substance or substances having relatively small molecular sizes, and to separate the solution from the gel bed.

It has been shown that the method just described makes possible a surprisingly good degree of separation between high molecular weight substances and low molecular weight substances, from a viscous solution thereof. One particularly essential advantage of the method is that excellent separating results are obtained when treating solutions having a viscosity of as high as approximately 6,500 centipoise.

If the method of the invention is effected in a centrifuge, the same can be performed in the following manner: the internal jacket surface is coated with a layer of porous material, for instance porous polyethylene. A suspension of swollen gel grains in the solvent is introduced into the centrifuge, the r.p.m. of which is set to a speed sufficient to pack the bed onto the jacket surface. Subsequent to the bed being packed, the r.p.m. of the centrifuge is increased to a rate sufficiently high to drive out the solvent between the grains, if this has not already taken place when the grains were packed to form a bed. The r.p.m. of the centrifuge is then reduced to a low rate, whereupon the viscous sample solution is introduced into the inlet side of the bed. The sample rapidly spreads out over the inlet side and penetrates into the gel bed; the sample being retained completely or substantially in the bed at the permitted r.p.m. After a certain period of contact, the r.p.m. of the centrifuge is increased to the said high value so that the sample, which is now freed from the substance or substances of relatively low molecular weights, is driven off. The r.p.m. of the centrifuge is then once again reduced to the said low value, whereupon solvent is applied to the inlet side of the gel bed and allowed to pass the bed, to elute the substance or substances which have penetrated the interior of the gel grains during the previous working step. As soon as the gel bed has been freed from, firstly the previously absorbed substances, and secondly from solvent in the spaces between the gel grains, the bed is once again ready for a new separating process. One great advantage of the method being described is that a centrifuge method can be very easily automatized by programming on a time basis, whereby the separation process can be made to run continuously, periodically with relatively scanty supervision.

It is also possible to effect the method according to the invention by means of a common filter. In this instance, a suspension of gel grains swollen in the solvent, are placed on a porous plate, the other side of which communicates with a source of vacuum: whereupon the solvent is removed by suction from the bed built on the porous support, at the same time as the spaces in the bed are filled with a gaseous medium, such as air. The viscous sample solution is then brought to the inlet side of the bed, as in the case with the previously described method. However, the removal of the solvent between the gel grains by suction may cause the bed to crack, particularly in the case of thick beds. The cracks thus formed must therefore be sealed, by processing the gel during the suction step. In this way a filter bed is finally obtained which no longer cracks apart and which is suitable for separation according to the instant method.

An example of products which form gel grains after swelling and which are suitable for use in the present invention are copolymers of polyhydroxy compounds with bifunctional compounds such as those described in U.S. Patent No. 3,208,994, copolymers of ethylenically saturated compounds with alkylidene-bisacrylamides according to British Patent No. 1,004,669, agar and agaros.

EXAMPLES

The following examples are illustrative of some preferred embodiments of the present invention. The average molecular weight $\overline{M}_w$ may be determined by light scattering measurements. The "limiting viscosity" $\eta$ is a function of the average molecular weight.

Example 1

600 g. of water-swollen gel grains of a copolymer of dextran with epichlorohydrin, said copolymer having a water regain of 2.4 g. per g. of dry substance (particle sizes 10–14$\mu$); and a centrifuge having 820 cms.$^2$ filter area and a rotation radius of 0.1135 m. at the filter area were used in the test. An aqueous suspension of gel grains was introduced into the centrifuge which was then started; a layer of gel grains being formed on the filter surface. The r.p.m. of the centrifuge was then increased until the water between the gel grains had been effectively removed; the spaces between the gel grains being filled with air. 500 ml. of an aqueous solution having a viscosity of 1.02 cp. at 20° C., containing 0.91 g. of albumin and 2.05 g. of sodium chloride per 100 ml., were then added at a relatively low r.p.m. corresponding to approximately 60×$g$ ($g$=gravity constant) at the filter surface. The centrifuge was allowed to run at this speed for 17 minutes. The r.p.m. of the centrifuge was then increased to a rate corresponding to 1000×$g$ at the filter surface; 530 ml. of centrifugate being recovered, containing 0.86 g. of albumin and 0.0082 g. of sodium chloride per 100 ml. Of the sodium chloride in the sample it was found that 0.4 percent remained in the centrifugate, whereas the content of sodium chloride in the desalted albumin was 0.95 percent.

The yield of albumin was 100 percent.

Example 2

In a similar manner as in Example 1, but using 600 g. of gel grains having particle sizes between 20 and 80$\mu$, 500 ml. of an aqueous solution containing 20.25 g. of dextran of the average molecular weight ($\overline{M}_w$) 250,000 and $\overline{M}_n$=123,000 ("Dextran 250") per 100 ml. and 20.7 percent of sodium chloride in the dry substance was subjected to gel filtration through the gel bed; the solution having a viscosity of 110 cp. at 20°.

532 ml. of a centrifugate, containing 16.9 g. of dextran per 100 ml. and 0.02 percent of sodium chloride in the dry substance was tapped off. It was found that 0.08 percent of the total content of salt in the sample remained in the centrifugate.

The yield of dextran was 89 percent.

Example 3

In the same manner as in Example 1 but using the same amount of gel grains of the same grain sizes as in Example 2, 500 ml. of an aqueous solution of approximately the same viscosity as in Example 2, containing 20 g. of dextran of the average molecular weight 250,000 and 5 g .of glucose per 100 ml. of solution were subjected to gel filtration through the gel bed. 520 ml. of a centrifugate were drained off, containing 17.25 g. of dextran per 100 ml. and only slight traces of glucose.

The yield of dextran was 90 percent.

Example 4

In a similar manner as in Example 1, but using the same amount of gel grains having the same sizes as in Example 2, 500 ml. of an aqueous solution having a viscosity of 220 cp. at 20° C. and containing 24.6 g. of dextran ($\overline{M}_w$=250,000) per 100 ml. and 21.0 percent of sodium chloride in the dry substance were subjected to gel filtration through the gel bed. 565 ml. of a centrifugate were obtained, containing 18.7 g. of dextran per 100 ml. and 0.01 percent of sodium chloride in the dry substance. It was found that 0.04 percent of the salt content of the sample remained in the centrifugate.

The yield of dextran was 86 percent.

Example 5

In a similar manner as in Example 1, but using 589 g. of a copolymer of the type set forth in Example 1, but having grain sizes of 100–300$\mu$ and a water regain of 2.6 g. per g. of dry substance, 495 ml. of a solution of native dextran with a viscosity of 1770 cp. at 25° C. (Brookfield LV viscosimeter, spindle 3 for 60 r.p.m.) were subjected to gel filtration through the gel bed. The solution contained 24.7 g. of dextran per 100 ml. and 20.0 percent of sodium chloride in its dry substance.

600 ml. of a centrifugate were drained off containing 17.8 g. of dextran per 100 ml. and 0.02 percent of sodium chloride in its dry substance. It was found that 0.06 percent of the salt content of the sample remained in the centrifugate.

The yield of dextran was 87 percent.

Example 6

457 ml. of a solution containing 1.99 g. of hydroxyethyl cellulose (Hercules Natrosal 250 Mr) and 1.74 g. of sodium chloride per 100 ml. were gel filtered as in Example 5. The viscosity of the solution measured with a Brookfield LV viscosimeter spindle 4 for 60 r.p.m. was 6,500 cp. at 25° C. However, the sample must be centrifuged off at a higher r.p.m. than normal, and in this case at a r.p.m. corresponding to 1,700×$g$ (the normal r.p.m. for the centrifuging-off process corresponds to 1000×$g$).

430 ml. of a centrifugate with 1.73 g. of hydroxyethyl cellulose and 0.116 g. of sodium chloride per 100 ml. were centrifuged-off and 94 percent of the sodium chloride content of the sample were removed.

The yield of hydroxyethyl cellulose was 87 percent.

Example 7

In a manner similar to Example 1, 500 ml. of an aqueous solution, containing 9.36 g. of sodium dextran sulphate per 100 ml., said sulphate being prepared from dextran having an average molecular weight ($\overline{M}_w$) of about 500,000, and 10.7 percent of sodium chloride in its dry substance, said aqueous solution having a viscosity of 20 cp. at 20° C., were subjected to gel filtration with 600 g. of a copolymer of grain sizes 20–80 $\mu$. 593 ml. of centrifugate, containing 6.39 g. of sodium dextran sulphate per 100 ml. and 0.05 percent of sodium chloride in its dry substance, were discharged. 0.33 percent of the salt content of the sample were found in the centrifugate, which contained 81 percent of the added sodium dextran sulphate.

Example 8

In a manner similar to Example 6, 500 ml. of an aqueous solution, containing 9.19 g. of diethylaminoethyl dextran hydrochloride per 100 ml., said substituted dextran being prepared from dextran having an average molecular weight ($\overline{M}_w$) of about $2 \times 10^6$, and containing 8.5 percent of calcium chloride in its dry substance, said aqueous solution having a viscosity of 47 cp. at 20° C., were subjected to gel filtration. 605 ml. of a salt-free centrifugate, containing 5.97 g. of diethylaminoethyl dextran hydrochloride per 100 ml., were discharged. 79 percent of the diethylaminoethyl dextran hydrochloride of the sample were found in the centrifugate. By a centrifuging-off operation at a greater centrifugal force ($2000 \times g$) than in Example 1, it was possible to increase the yield of diethylaminoethyl dextran hydrochloride to 88 percent.

Example 9

In a manner similar to Example 1, but while using the same amount of gel grains having the same grain sizes as in Example 2, 500 ml. of an aqueous solution, containing 28.7 g. of a water soluble copolymer of sucrose with epichlorohydrin per 100 ml. and 22.9 percent of sodium chloride in its dry substance, said solution having a viscosity of 50 cp., were subjected to gel filtration.

| Results | The limiting viscosity number, $\eta$ | Salt content of the dry substance, percent | Yield, percent |
|---|---|---|---|
| Sample, 500 ml | 0.152 | 22.5 | |
| Fraction 1, centrifugate 573 ml | 0.204 | 0.006 | 63 |
| Fraction 2, obtained by leaching | 0.054 | | 37 |

Example 10

In a manner similar to Example 1, 3 ml. of an aqueous solution, containing 19.9 g. of dextran of the average molecular weight ($\overline{M}_w$) 250,000 and 20.7 percent of sodium chloride in its dry substance, said solution having a viscosity of 105 cp. at 20° C., were treated with about 20 ml. of a gel of a copolymer of hydroxyethyl cellulose with epichlorohydrin, said copolymer having grain sizes in the range of from 100 to 400 $\mu$ and a water regain of 4.57 g. per g. of dry substance, for de-salting purposes. This gel filtration was not performed in the centrifuge according to Example 1, but in a laboratory centrifuge having a centrifuge tube provided with a filter insert.

The yield of dextran was 84 percent and the content of sodium chloride in the dry substance was 0.05 percent.

Example 11

A bed of gel grains of a copolymer of dextran with epichlorohydrin (water regain 2.5 g. per g. of dry substance), having grain sizes in the range of from 20 to 80$\mu$ was packed on a ssction filter of glass having 75.4 cms.² filter surface covered with a filter plate of cellulose and asbestos, by removing the water from the bed by suction and pressing together the cracks thus formed until a right, well packed bed was obtained, the space between the gel grains being filled with air. The height of the bed was 5 cm. and the volume approximately 380 ml.

126 ml. of an aqueous solution, containing 19.76 g. of dextran of the average molecular weight ($\overline{M}_w$) 250,000 per 100 ml. and 19.3 percent of sodium chloride in its dry substance were added without suction. The viscosity of the solution was about 100 centipoises at 20° C.

The sample penetrated slowly down into the gel bed. It was then removed from the gel by suction under vacuum. After 2½ hours, 112 ml. of a solution having a content of dextran amounting to 16.74 g. per 100 ml. had been removed by suction, said solution containing 0.010 percent of sodium chloride in its dry substance.

The yield of dextran was 75 percent.

Example 12

A bed of swollen gel grains of the same copolymer as in Example 11 was packed in a pressure filter having a filter surface of 109 cm.² covered with a filter plate as in Example 11, a 5 cm. thick gel bed being obtained in the same way as described in Example 11, but in this case compressed air was used instead of a vacuum.

182 ml. of an aqueous solution were added, containing 5.08 g. of dextran of the average molecular weight ($\overline{M}_w$) 250,000 per 100 ml. and 19.3 percent of sodium chloride in its dry substance.

After a 17 minute period of contact, the sample was pressed out, applying a successively increasing pressure. 144 ml. of a solution, having a content of 5.33 g. of dextran per 100 ml. and 0.071 percent of sodium chloride in its dry substance, were pressed out, corresponding to a dextran yield of 83 percent.

Example 13

An injection spray with a piston diameter or 21 mm. and with an inserted filter bottom of porous polyethylene was filled, in vertical position, with gel grains of the same copolymer as in Example 11, to a bed height of 6.7 cm., gel volume 23 cms.³.

10 ml. of water were pressed out from the gel, which was then allowed to expand; the space between the gel grains being filled with air. The drained volume represented 43 percent of the bed volume and would appear to have equalled slightly more than the "void" volume.

4.07 ml. of an aqueous solution, containing 19.9 g. of dextran with an average molecular weight of 250,000 per 100 ml. and 20.7 percent of sodium chloride (viscosity approximately 100 cp./20° C.) in its dry substance were added to the bed. After a 17 minute period of contact, the sample was pressed out, three separate fractions being removed and analysed. Result: See the table below.

SOLUTION PRESSED OUT

| Fraction No.: | Ml. | "Dextran 250" G. | NaCl. mg. |
|---|---|---|---|
| 1 | 2.1 | 8.48   0.178 | 0 |
| 2 | 2.2 | 16.05  0.353 | 0 |
| 3 | 1.7 | 11.30  0.192 | 0.33 |
| Total | 6.0 | 0.723 | 0.33 |

Dextran yield 89 percent.
NaCl content in the dry substance 0.05 percent.
NaCl remaining in the dry substance 0.02 percent.

Example 14

A chromatography tube of approximately 25 mm. in diameter was packed with the same gel grains as in Example 11, to a volume of 94 ml. in water saturated with n-butyl alcohol. The aqueous solution was drained off until the gel bed was only just dry. n-Butyl alcohol was then added and allowed to pass through the bed to elute the water between the gel grains. In completion of this phase, a sample comprising 19 ml. of an aqueous solution containing 0.53 g. of dextran of $\overline{M}_w$=250,000 per 100 ml. and 20.3 percent of sodium chloride, in its dry substance, was added.

The sample was eluted with water-saturated n-butyl alcohol.

19 ml. of eluate were discharged and found to contain 0.40 g. of dextran per 100 ml. and only traces of salt.

The dextran yield was 75 percent.

Those skilled in the art, and particularly in the art to which this invention pertains, will readily appreciate that many modifications of the basic invention set forth here are possible. All such obvious modifications would not avoid infringement under the well known "doctrine of equivalents."

What we claim is:

1. A method for separating substances having different molecular sizes from a solution of these substances having a viscosity of 5 centipoises or more, the solution being introduced into a stationary bed of mutually immobile gel grains swollen in the solvent and having such a structure that none of the substances contained in the solution, with relatively large molecular sizes are able to penetrate, to a substantial degree, the interior of the gel grains, and a solution depleted of substances with relatively small molecular sizes is removed from the bed, characterized in that, prior to introducing the solution into the bed, it is ensured that the spaces between the gel grains are substantially completely filled with a fluid medium immiscible with the solvent, and on introduction of the solution the same is extended as a layer over the inlet side of the bed and the solution is caused to pass through the bed as a zone.

2. A method as set forth in claim 1, characterized in that the space between the gel grains is filled with said fluid medium by means of centrifugal force.

3. The method set forth in claim 1, characterized in that the space between the gel grains is filled with said fluid medium by creating a difference in pressure between the inlet side and the outlet side of the bed.

4. The method set forth in claim 3, wherein a pressure is created on the inlet side.

5. The method as set forth in claim 3, wherein a vacuum is created on the outlet side.

6. The method set forth in claim 1, wherein the solution intended for separation is extended over the inlet side of the bed by means of centrifugal force.

7. The method set forth in claim 1, wherein the speed at which the viscous solution is caused to pass through the bed is controlled by means of centrifugal force.

8. The method set forth in claim 1, wherein the solution depleted of the substances of relatively small molecular sizes is separated from the bed of gel grains by means of centrifugal force.

References Cited

UNITED STATES PATENTS

| | | | |
|---|---|---|---|
| 3,002,823 | 10/1961 | Flodin et al. | 210—31 X |
| 3,326,875 | 6/1967 | Moore | 210—31 X |

SAMIH N. ZAHARNA, Primary Examiner

U.S. Cl. X.R.

23—311; 210—31; 260—126, 209